United States Patent
Lobo et al.

(10) Patent No.: US 10,386,194 B2
(45) Date of Patent: Aug. 20, 2019

(54) ROUTE-BIASED SEARCH

(71) Applicant: Apple Inc., Cupertino, CA (US)

(72) Inventors: Philomena F. Lobo, Santa Clara, CA (US); Saurabh V. Pendse, San Jose, CA (US); Dennis Schieferdecker, Cupertino, CA (US); Daniel R. Delling, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/299,427

(22) Filed: Oct. 20, 2016

(65) Prior Publication Data

US 2017/0356752 A1    Dec. 14, 2017

Related U.S. Application Data

(60) Provisional application No. 62/348,810, filed on Jun. 10, 2016.

(51) Int. Cl.
 *G01C 21/34*    (2006.01)
 *G01C 21/36*    (2006.01)

(52) U.S. Cl.
 CPC ..... *G01C 21/3476* (2013.01); *G01C 21/3415* (2013.01); *G01C 21/3679* (2013.01)

(58) Field of Classification Search
 CPC ............ G01C 21/3476; G01C 21/3415; G01C 21/3644; G01C 21/3661
 See application file for complete search history.

(56) References Cited

U.S. PATENT DOCUMENTS

| | | |
|---|---|---|
| 7,603,360 B2 | 10/2009 | Ramer et al. |
| 8,364,717 B2 | 1/2013 | Delling et al. |
| 8,494,771 B2 | 7/2013 | Delling et al. |
| 8,527,483 B2 | 9/2013 | Väänänen |
| 8,583,363 B2 | 11/2013 | Abraham et al. |
| 8,738,559 B2 | 5/2014 | Delling et al. |
| 8,886,573 B2 | 11/2014 | Delling |
| 8,996,312 B1 | 3/2015 | Freund et al. |
| 9,052,208 B2 | 6/2015 | Blom et al. |

(Continued)

FOREIGN PATENT DOCUMENTS

WO    WO-2016062732    4/2016

OTHER PUBLICATIONS

Carlsen, Mads V., et al., "Finding Alternative Shortest Paths in Road Networks for Mobile Traffic Navigation", ACM Transactions on Embedded Computing Systems, (6/00/2012), 1-12.

(Continued)

*Primary Examiner* — Michael D Lang
(74) *Attorney, Agent, or Firm* — Womble Bond Dickinson (US) LLP

(57) ABSTRACT

A route-biased search in a mobile navigation system locates points of interest (POI) on or convenient to a mobile user's current travel. The route-biased search operates in two modes, navigation and non-navigation. The navigation mode identifies the most convenient POIs that honor the mobile user's route to their destination. The non-navigation mode identifies the most convenient POIs that are located ahead of the user based on the user's inferred direction of travel. The route-biased search determines the best possible routes to the identified POIs taking into account the impact of the detour costs of traveling to the POI along with other ranking factors.

29 Claims, 13 Drawing Sheets

(56) References Cited

U.S. PATENT DOCUMENTS

| | | |
|---|---|---|
| 9,146,118 B2 | 9/2015 | Liu et al. |
| 9,222,791 B2 | 12/2015 | Delling |
| 9,443,034 B2 | 9/2016 | Werneck et al. |
| 2005/0165543 A1 | 7/2005 | Yokota |
| 2011/0295497 A1 | 12/2011 | Abraham et al. |
| 2012/0123678 A1* | 5/2012 | Poppen .............. G01C 21/3476 701/468 |
| 2012/0179674 A1 | 7/2012 | Delling et al. |
| 2012/0192138 A1 | 7/2012 | Delling et al. |
| 2012/0250535 A1 | 10/2012 | Delling et al. |
| 2012/0254153 A1 | 10/2012 | Abraham et al. |
| 2012/0254597 A1 | 10/2012 | Delling et al. |
| 2012/0310523 A1 | 12/2012 | Delling et al. |
| 2013/0103313 A1 | 4/2013 | Moore et al. |
| 2013/0060468 A1 | 5/2013 | Delling et al. |
| 2013/0132369 A1 | 5/2013 | Delling et al. |
| 2013/0144524 A1 | 6/2013 | Abraham et al. |
| 2013/0231862 A1 | 9/2013 | Delling et al. |
| 2013/0268549 A1 | 10/2013 | Delling et al. |
| 2014/0025494 A1 | 1/2014 | Ramer et al. |
| 2014/0107921 A1 | 4/2014 | Delling et al. |
| 2014/0129594 A1 | 5/2014 | Delling et al. |
| 2014/0235279 A1 | 8/2014 | Väänänen |
| 2015/0180816 A1 | 6/2015 | Varoglu et al. |
| 2015/0285652 A1* | 10/2015 | Peri .................... G01C 21/3476 701/438 |
| 2015/0347625 A1 | 12/2015 | Werneck et al. |
| 2015/0347629 A1 | 12/2015 | Pajor et al. |
| 2015/0350840 A1 | 12/2015 | Pham et al. |
| 2015/0356759 A1 | 12/2015 | Delling et al. |
| 2016/0078148 A1 | 3/2016 | Werneck et al. |

OTHER PUBLICATIONS

Delling, Daniel , et al., "Landmark-based routing in dynamic graphs", WEA'07 Proceedings of the 6th international conference on Experimental algorithms, (Jun. 6, 2007).

Goldberg, et al., "Better Landmarks within Reach", WEA '07 Proceedings of the 6th international conference on Experimental algorithms (2007), 38-51.

Gutman, Ron , "Reach-based routing: A new approach to Shortest Path", Society for Industrial and Applied Mathematics, Proceedings 6$^{th}$ Workshop on Algorithm Engineering and Experiments (ALENEX) (2004), (Jan. 6, 2004), 100-111.

* cited by examiner

ETA CALCULATION – NAVIGATION MODE 300 eta(U, P) + eta(P, R) ≈ eta(U, R)
(signal for good POI)

ETA CALCULATION – NON-NAVIGATION MODE 400 eta(R, U) + eta(U, P) ≈ eta(R, P)
(signal for good POI)

ROUTE-BIASED SEARCH

CROSS-REFERENCE TO RELATED APPLICATIONS

This application claims the benefit of the earlier filing date of provisional Application Ser. No. 62/348,810, filed on Jun. 10, 2016 entitled ROUTE-BIASED SEARCH.

TECHNICAL FIELD

Embodiments of the present invention relate generally to mobile navigation systems. More particularly, embodiments of the invention relate to navigation searches in mobile navigation systems.

BACKGROUND

Mobile navigation systems in location-aware devices are now common. Mobile device navigation and car navigation systems have grown in popularity with the ability to provide up-to-date navigation information and visual map-based navigation aids to users en route.

Searching for particular points of interest (POIs) and alternate routes while en route can present problems in navigation systems because of the need to adjust the results based on the user's location. A common approach is to use a spatial search, such as for POIs within a certain radius of a current location. This approach cannot always return the best search results. Among other shortcomings, it fails to take into account the user's route, intended destination or the direction of travel.

SUMMARY OF THE DESCRIPTION

Methods, processes, apparatus, machine-readable tangible storage media, and data processing systems are described for a route-biased search in a mobile navigation system. In a navigation system on a mobile device, a route-biased search helps a user find out what points of interest (POI) are on or convenient to their original route, and to display one or more side routes to those POIs that honor the original route whenever possible taking into account the current route conditions, e.g. traffic and road closures, and the type of the POI, e.g. restaurants vs gas stations.

According to one embodiment, instead of a conventional spatial search, such as for POIs within a certain radius of a current location, the route-biased search factors in the user's original route to generate search result POIs.

In one embodiment, using a single unified ranking algorithm, detour costs of search result POI'S is an additional ranking signal that is taken into account along with all other ranking factors, e.g. popularity, reviews, rating, etc. to determine the best search result POIs to present to the user. Thus, the ranking algorithm is more likely to rank a POI with optimal detour costs as better than a POI without optimal detour costs in situations where all other ranking factors are comparable.

In one embodiment, the route-biased search operates in two different modes: a navigation mode, in which the user's original route is to a known destination, and a non-navigation mode, in which the user's original route is estimated/inferred based on the user's direction of travel from a historical reference point but without a known destination.

In one embodiment, the user's original route characteristics influence the search result POIs. For example, when factoring in the user's original route to generate the search result POIs, the route-biased search can take into account a prior location of the user that precedes a route decision point to ensure that POIs with potentially optimal detour costs that require some backtracking are considered. Other characteristics associated with the original route that are taken into account in the route-biased search include the speed of travel (walking vs. driving) and the type of road (highway vs. local road). Additionally, query-level characteristics such as the specific category (e.g. gas vs. restaurants) are also taken into account to bias results close to the user or optimize the detour cost.

In one embodiment, while in navigation mode, the route-biased search obtains detour costs associated with search result POIs by combining the estimated time of arrival (ETA) from the user's location to a POI with the ETA from the POI to the known destination, and comparing the combined ETA to the ETA from the user's location directly to the known destination.

In one embodiment, while in non-navigation mode, the route-biased search combines the ETA from a historical reference point, also referred to as a prior location, earlier in the user's journey to the user's current location and from the user's current location to the POI. In one embodiment, the non-navigation mode of operation is typically conditioned on the user traveling beyond a speed threshold to ensure that there is a strong sense of the user's direction of travel to avoid false positives. To obtain the detour cost the combined ETA is compared to the ETA from the historical reference point directly to the POI.

In one embodiment, once the POIs have been located using the route-biased search and their detour costs determined, the detour cost is included in the single unified ranking algorithm when re-ranking the search result POIs. Detour cost is an important ranking signal into the unified ranking algorithm.

In a one embodiment, the proximity of the POI to the user's current location and other factors are also taken in to account to avoid returning POIs that have optimal small detour costs, but are farther away or less popular. For this reason, a POI with a higher detour cost could still be ranked over a POI with an optimal small detour cost because of much higher popularity, or because it is closer to the user's current location. In one embodiment, the category of the POI can further influence the ranking. For example the gas station category POIs may be ranked higher when closure to the user's current location, whereas the restaurant category POIs with higher popularity may be ranked ahead of other closer restaurants that are less popular.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
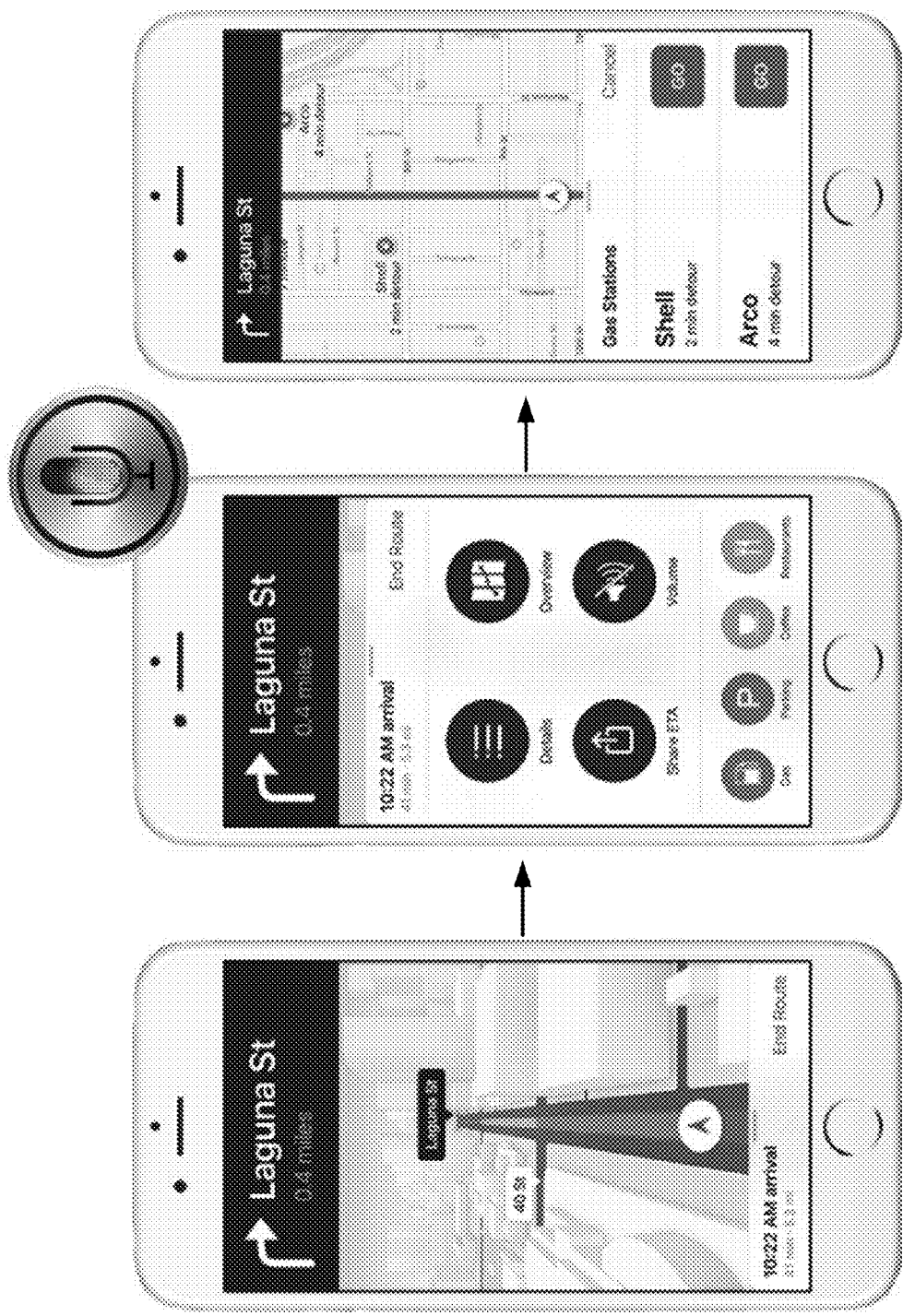
FIG. 1 illustrates an exemplary user interface of a mobile device accessing a route-biased search in a mobile navigation system in accordance with an embodiment of the invention.

Methods, processes, apparatus, machine-readable tangible storage media, and data processing systems are described for a route-biased search in a mobile navigation system are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow represent processing logic comprising hardware (e.g. circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Unlike a conventional spatial search carried out in mobile navigation system, embodiments of the present invention factor in the user's original route or direction of travel to generate search result POIs, referred to herein as a route-biased search.

A route-biased search has a number of advantages over a conventional spatial search when searching for points of interest (POI) along the user's route in the context of mobile navigation. The quality of the search results are improved both in the selection of suitable POIs as well as in providing useful information about detour costs associated with side trips to a POI.

In one embodiment, the route-biased search can be used in conjunction with a single unified searching algorithm that factors in such things as the user's personal preferences, user history, and other personal information data. Other advantages include embodiments that perform route-biased searches when the user is not navigating to a particular destination, referred to herein as non-navigation mode, as well as when the user is navigating to a known destination, referred to herein as navigation mode.

With regard to the user's personal information data, the present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure.

For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

FIG. 1 illustrates an exemplary user interface of a mobile device accessing a route-biased search in a mobile navigation system in accordance with an embodiment of the invention. As illustrated, a mobile device, such as an iPhone or other mobile computing device is configured to operate a mobile navigation system with a graphical user interface (GUI) presenting a user with a mobile navigation interface, as depicted in the three illustrated interfaces. In the first illustrated interface the user is presented with their current navigation route and their ETA. In the second illustrated interface the user has activated a control panel on the touch interface to reveal options for searching for points of interest to a mobile user, such as gas stations, parking lots, coffee-house, and restaurants. Upon activation of the gas station option, the user is presented with the third illustrated interface showing the nearby gas station POIs ranked by their associated detour costs as compared to the mobile user's original route.

Figure 2:
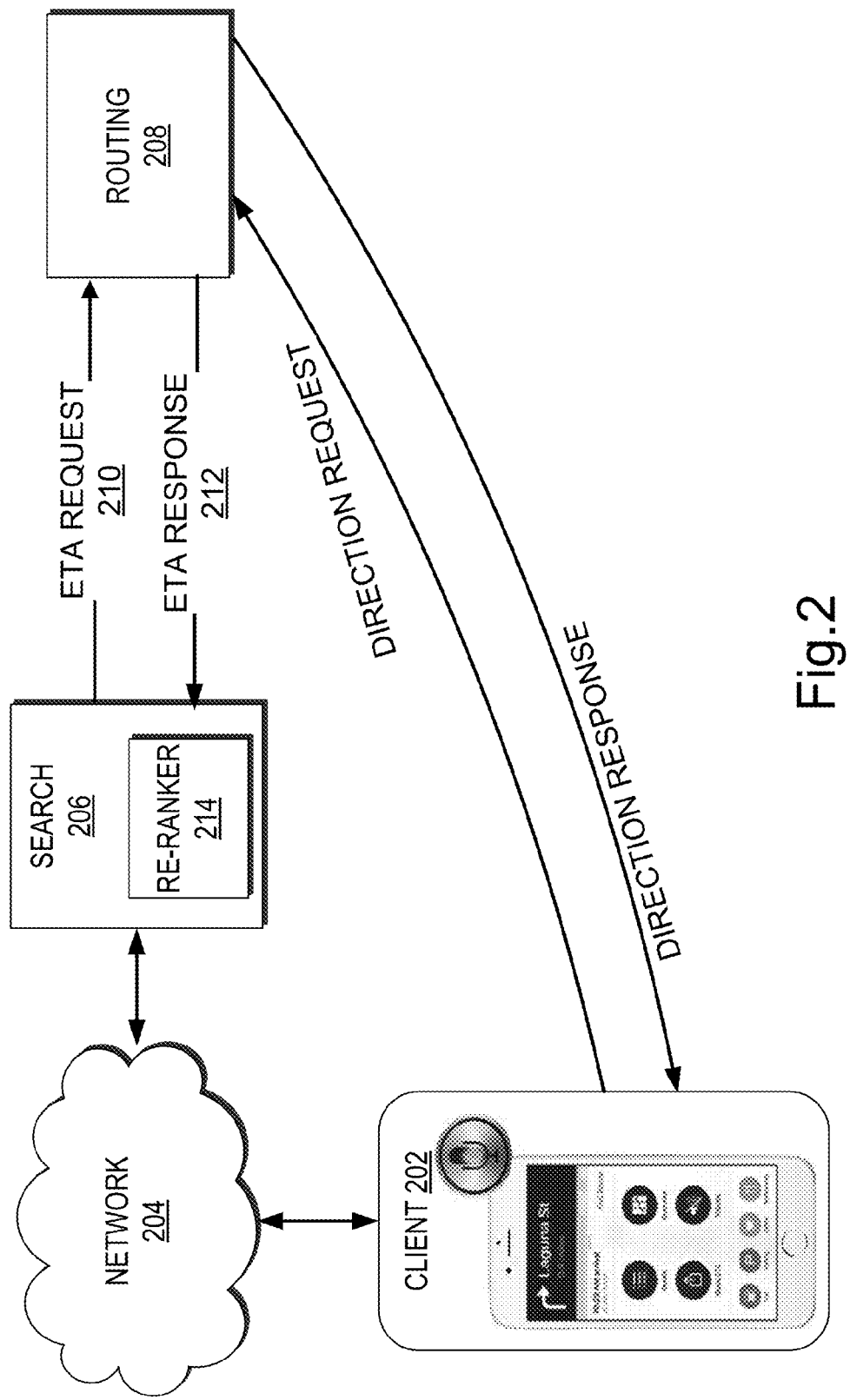
FIG. 2 is a block diagram overview of a route-biased search in a mobile navigation system in accordance with an embodiment of the invention.

FIG. 2 is a block diagram overview of a route-biased search in a mobile navigation system in accordance with an embodiment of the invention. As shown, in one embodiment, a client device 202, such as the mobile phone illustrated in FIG. 1, activates a route-biased search, causing the client 202 to access a search process 206 via network 204. The search process 206 determines an initial set of POIs responsive to the mobile user's search, and initiates an ETA request 210 in order to begin the route-biased search in accordance with an embodiment of the invention.

In one embodiment, a routing process 208, responsive to the ETA request 210, returns to the search process 206 an ETA response 212, thereby enabling the search process 206 to begin the route-biased search based on the ETA, as will be described in further detail below. Once the search process 206 completes the route-biased search and returns the search result POIs, a re-ranker process 214 applies a single unified ranking algorithm to the search result POIs, where the ranking algorithm includes the detour costs for each of the search result POIs as one ranking factor.

After the search process 206 and re-ranking 214 processes are complete, the search POI results are displayed on the user's mobile device in ranking order, typically in conjunction with a map display of the POIs. Once the results of the route-biased search are made available to the mobile device user, the user can initiate direction requests and receive direction responses from the routing process 208.

FIGS. 3A-3B and 4A-4B are diagrammatic overviews of ETA calculations in a route-biased search in accordance with an embodiment of the invention. As noted in FIG. 2, the search process requests an ETA for the initial set of POIs from the routing process.

Figure 3A:
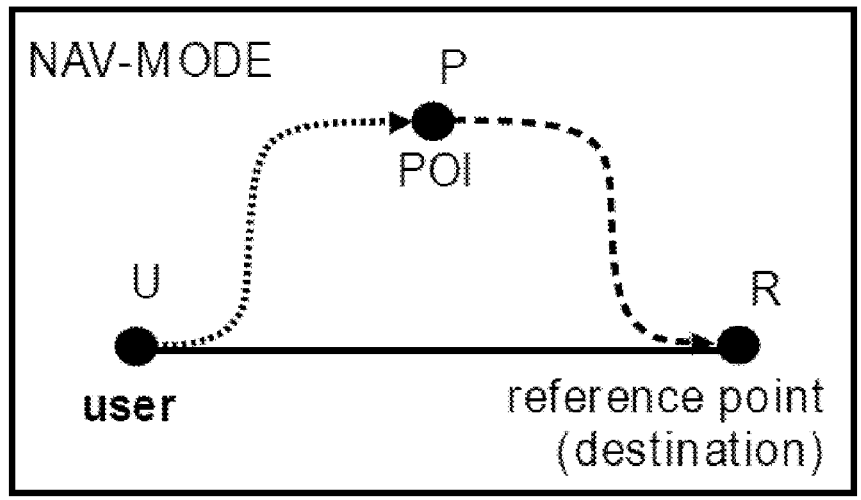
FIGS. 3A-3B and 4A-4B are diagrammatic overviews of ETA calculations in a route-biased search in accordance with an embodiment of the invention.
Figure 3B:
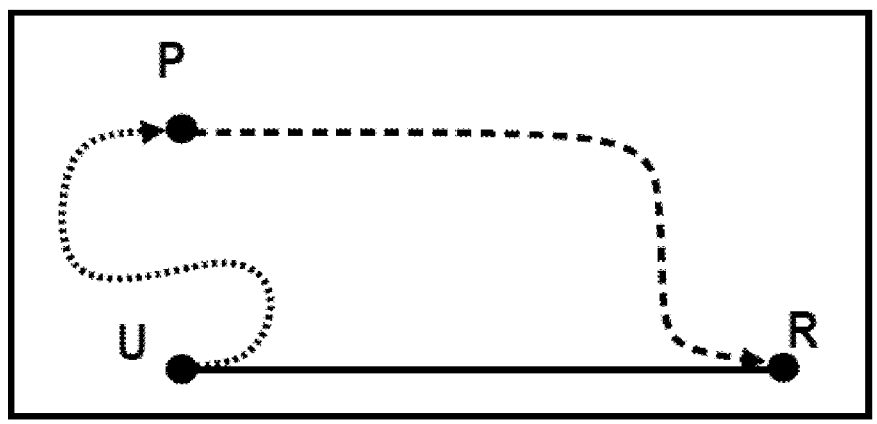

FIGS. 3A-3B, by way of example only, is a diagram illustrating the route for the ETA calculation when the mobile user initiates a route-biased search in a navigation mode of operation. In the navigation mode of operation, the route the user is taking is known and references a destination. The user's current location is designated with a U and the known destination is designated with an R because it is considered a reference point for route and detour cost calculations. The point of interest, or POI, for which routes, ETA signals and detour costs are computed is designated with a P.

Figure 4A:
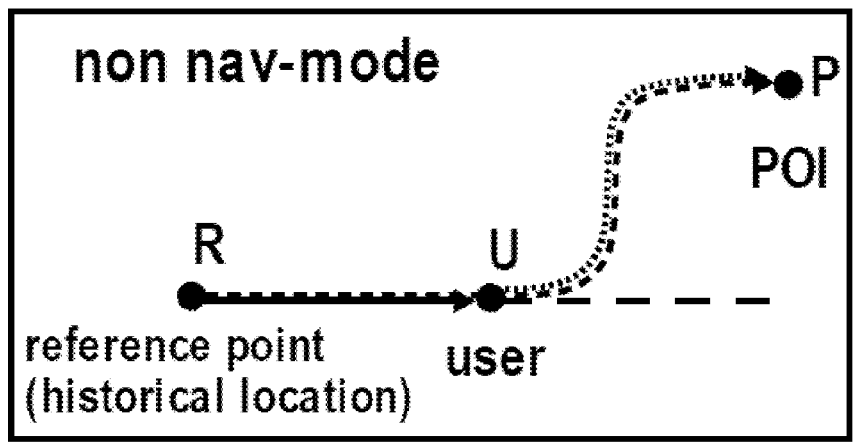
Figure 4B:
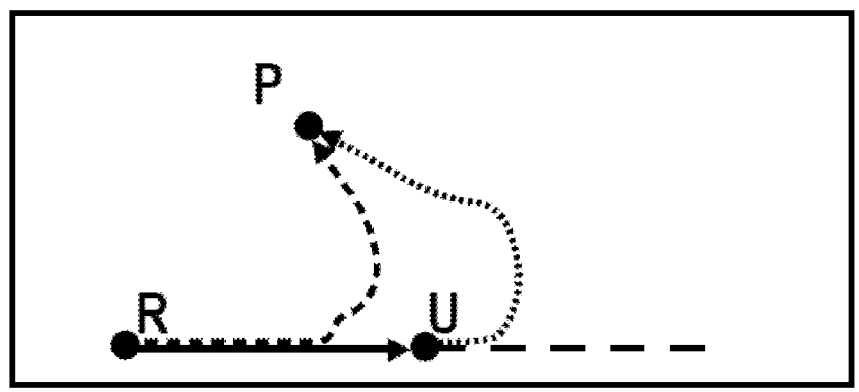

FIGS. 4A-4B, by way of example only, is a diagram illustrating the route for the ETA calculation when the mobile user initiates a route-biased search in a non-navigation mode of operation. In contrast to navigation mode, in the non-navigation mode of operation, the route the user is taking is not known, but the direction of travel can be gleaned from comparisons of one or more historical locations that the user frequented prior to arriving at the user's current location. The user's current location is again designated with a U and the user's historical location is designated with an R because in non-navigation mode the user's historical location is used as a reference point in lieu of a known destination. The POI for which routes, ETA signals and detour costs are computed is designated with a P.

In one embodiment, when operating in navigation mode FIG. 3A/3B, an ETA between the user's current location U and POI P is added to the ETA from P to the original destination/reference point R to yield a combined ETA. The combined ETA is compared to the ETA directly from the user's current location U to reference point R. If the combined ETA is comparable to the original route ETA, then the POI is determined to have a good ETA signal. If, however, the combined ETA is not comparable to the original route ETA, then the POI P is determined to have a poor ETA signal. The difference in the combined ETA considered to be comparable can be adjusted to take into account such characteristics as the user's speed, length of route, and the like. For example, the differences between the combined ETA and original route ETA can be fairly small when comparing ETAs for nearby POIs in densely populated areas and larger when comparing ETAs for distant POIs in rural areas.

In one embodiment, when operating in non-navigation mode, the route-biased search ETA calculation varies from that for navigation mode in that the reference point R for purpose of ETA calculations is the historical location of the user. The combined ETA is the ETA between R and U and between U to the POI P. The combined ETA is compared to the ETA between R and the POI P. If the difference is large, then the POI P is determined to have a poor ETA signal. As in navigation mode, the differences in the combined ETA considered to be comparable can be adjusted to take into account such characteristics as the user's speed, length of route, and the like. For example, the differences between the combined ETA and the ETA between R and P can be fairly small when comparing ETAs for nearby POIs in densely populated areas and larger when comparing ETAs for distant POIs in rural areas.

Figure 5:
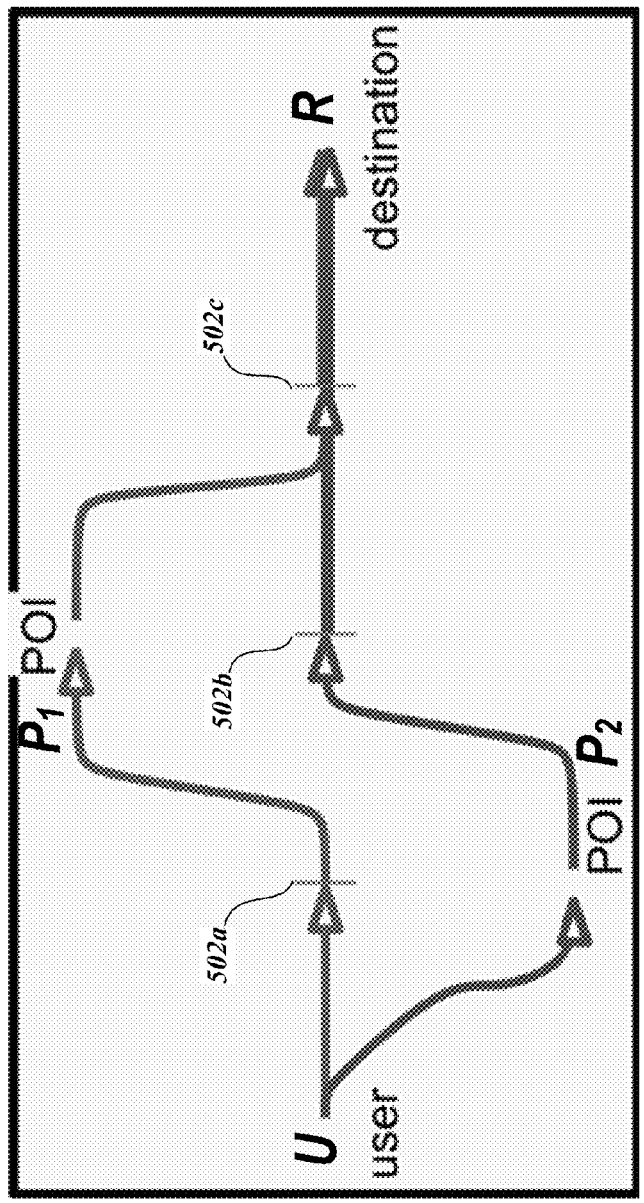
FIG. 5 is a diagrammatic overview of partitioning a route into segments for performing a route-biased search operating in navigation mode in accordance with an embodiment of the invention.

FIG. 5 is a diagrammatic overview of partitioning an original route into segments while in navigation mode. Partitioning the user's original route to their known destination enables the route-biased search to honor that route when searching for POIs in accordance with an embodiment of the invention. For example, in FIG. 5, an algorithm for honoring the user's route in a navigation mode of operation includes partitioning the original route from the user's current location U to the known destination at reference point R into multiple segments based on proximity to deviation points 502a/502b/502c. Once the segments have been partitioned, the route-biased search computes all possible routes to one or more POIs, e.g. $P_1$ and $P_2$, skipping no more than two segments of the user's original route in order to generate routes that honor the original route as much as possible.

Figure 6:
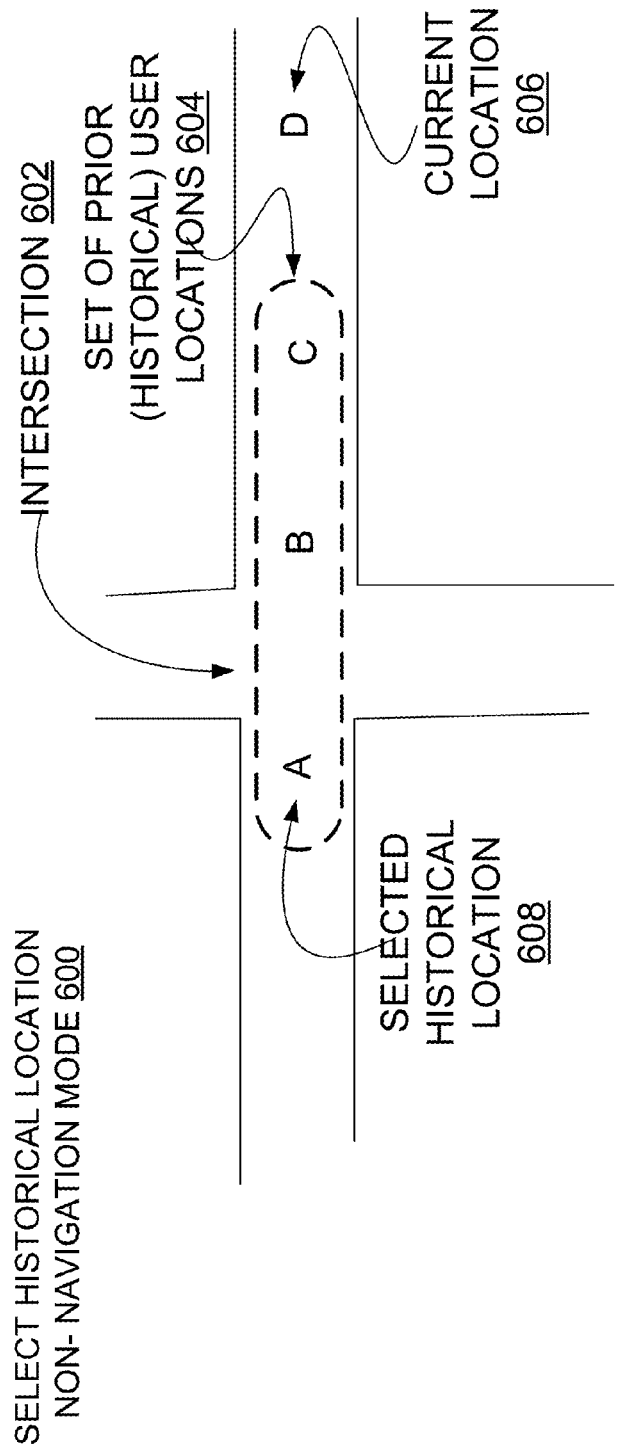
FIG. 6 is a diagrammatic overview of selecting a user's historical location for performing a route-biased search in non-navigation mode in accordance with an embodiment of the invention.

FIG. 6 is a diagrammatic overview of selecting an historical location to use as a reference point while in non-navigation mode. A selection process selects a location from one of a set of prior user locations (A B C) 604 relative to the current location D 606 of the user. The set of prior user locations is used to determine the direction of travel, while the selected location A 608 can be used during the route-biased search to identify POIs that are ahead of the user's current location. In one embodiment, the process for selecting the historical location to use as a reference point is based on the presence of a route decision point, such as intersection 602. Selecting the historical location preceding at least one such route decision point, if available, allows the route-biased search to compute the best possible routes to POIs while in non-navigation mode that might not otherwise be computed, because sometimes the best route to a POI may involve backtracking from the current location to the earlier route decision point.

Figure 7A:
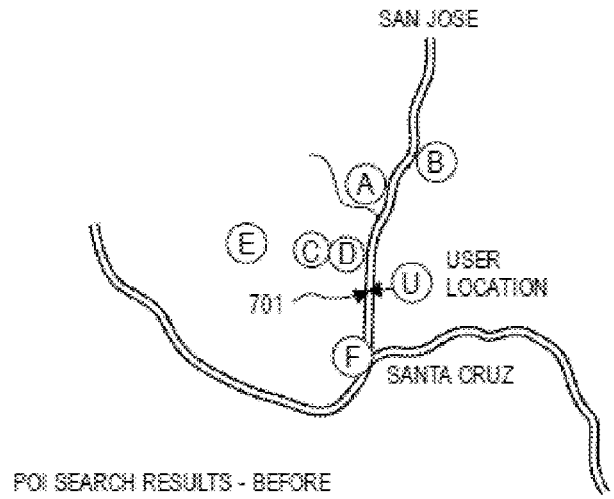
FIGS. 7A-7B illustrate exemplary search results in a route-biased search operating in non-navigation mode in accordance with an embodiment of the invention.
Figure 7B:
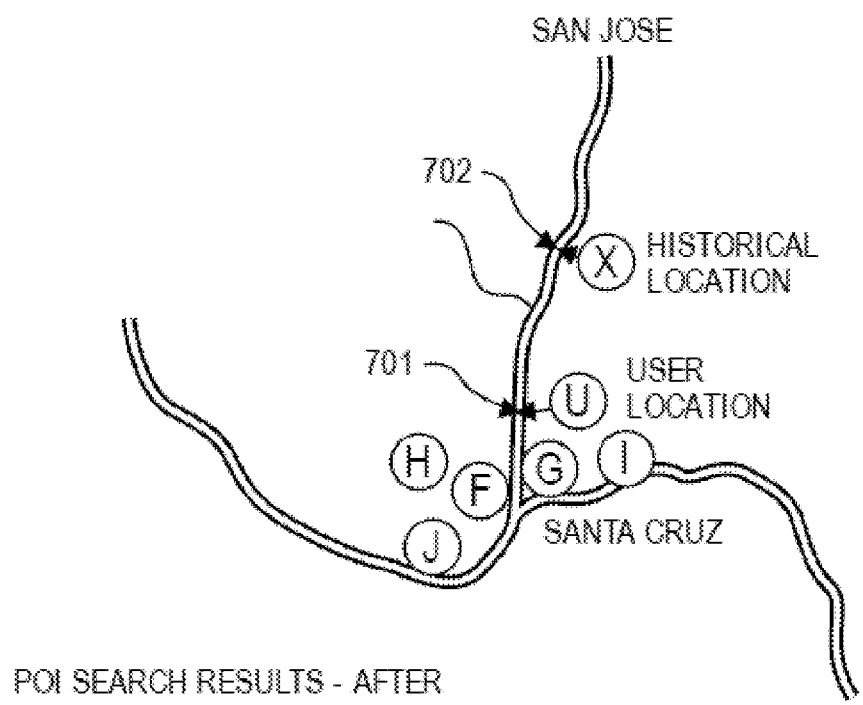

FIGS. 7A-7B illustrate exemplary search results using a route-biased search in non-navigation mode. In the illustrated example, FIG. 7A depicts the current user location U 701 of a user that is traveling toward Santa Cruz from San Jose. Without a route-biased search the POIs A, B, C, D, E and F returned from a conventional search are located around the user's current location without regard to the user's direction of travel. In contrast, FIG. 7B depicts the route-biased search results of POIs F, G, H, I and J, all of which are ahead of the user's current location U, as determined based on the user's historical location X 702 as a reference point R.

Figure 8A:
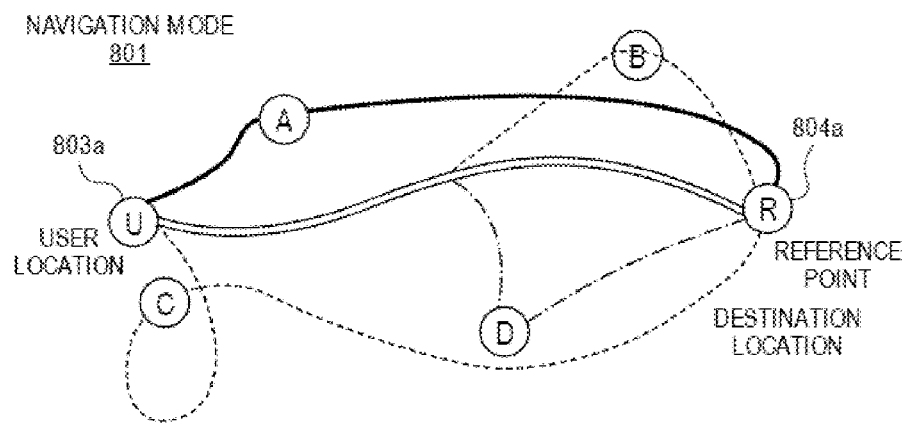
FIGS. 8A-8B illustrate routes generated in a route-biased search operating in navigation (FIG. 8A) and non-navigation (FIG. 8B) modes in accordance with an embodiment of the invention.
Figure 8B:
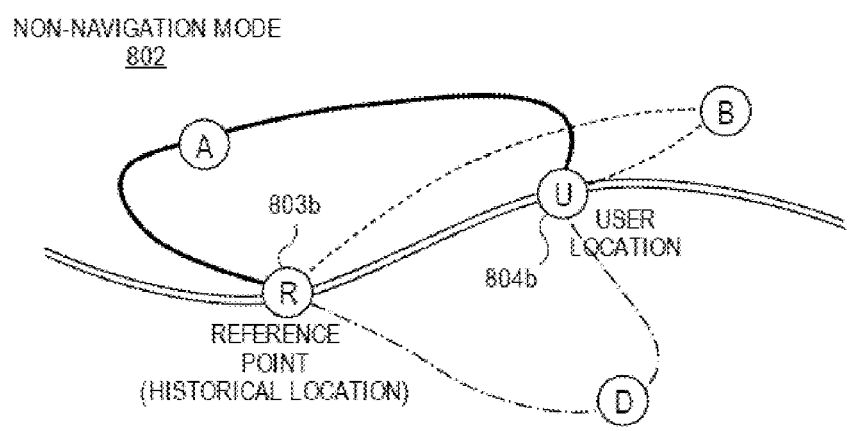

FIGS. 8A-8B illustrate examples of routes to POIs in a route-biased search in accordance with an embodiment of the invention. In FIG. 8A, an example search for routes to POIs that honor the user's route in a route-biased search operating in navigation mode is illustrated. There are four POIs, A, B, C, and D identified as having good ETAs along the original route from the user's current location U to the known destination/reference point R. In one embodiment, the route-biased search computes the four possible routes to the POIs and then to the known destination R, and determines which of the four provide the best alternatives in terms of detour costs that honor the user's original route to R based on the ETAs to each POI. For example, the POIs A and C could be determined to be POIs that the user could detour to immediately, POI B is the most distant, and POI D is a moderate detour.

In FIG. 8B, an example search for routes to POIs ahead of the user's current location in a route-biased search operating in non-navigation mode is illustrated. There are two POIs, B and D identified as POIs ahead of the user's current location based on the direction of travel, and a third POI A behind the user's current location, where the direction of travel is determined based on the user's historical location, reference point R 802b, and the current user location U 801b. In one embodiment, using the reference point R, the route-biased search computes the best possible routes to the POIs and back to the current location U, and determines which routes to the identified POIs provide the best alternatives in terms of detour costs.

Figure 9:
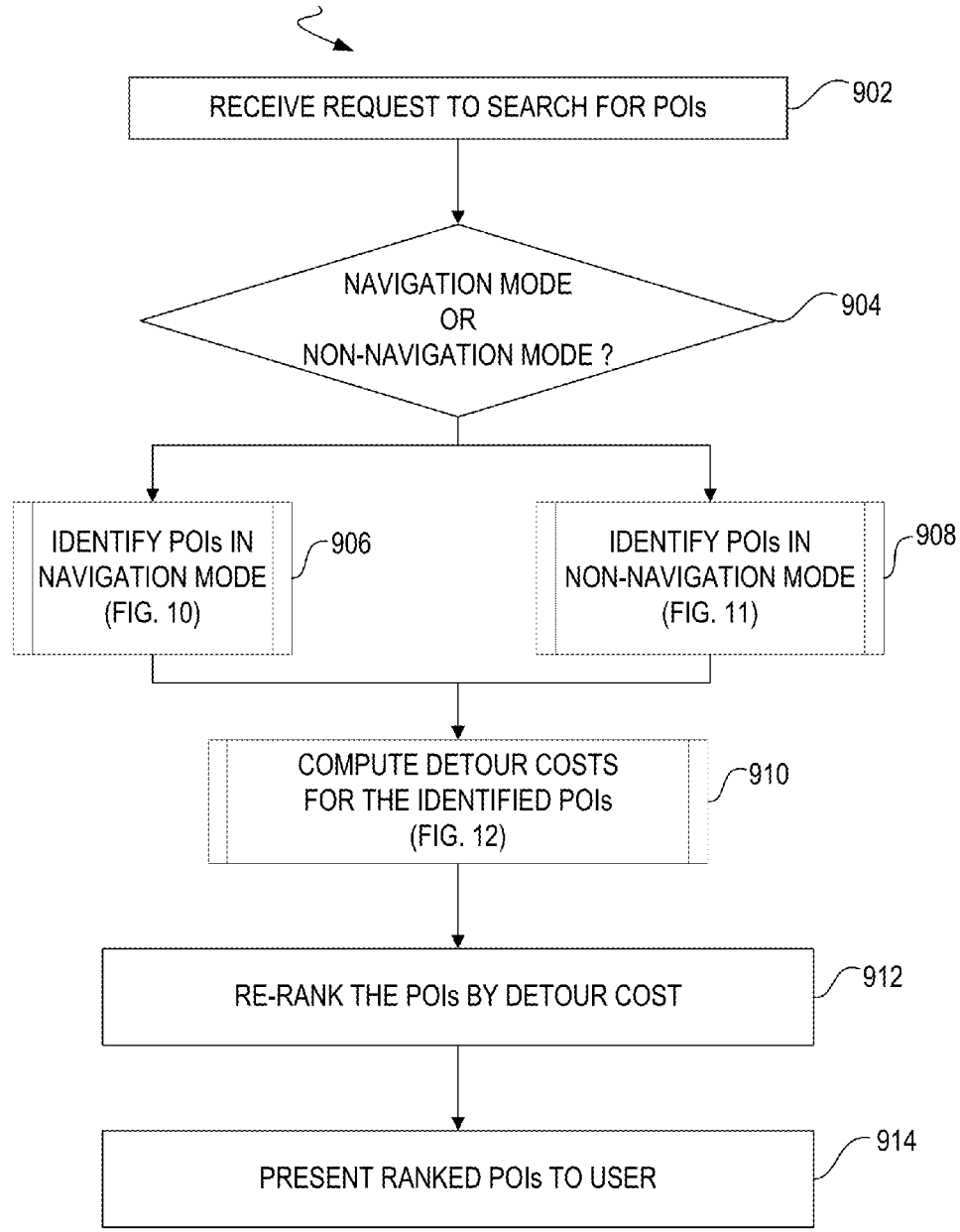
FIGS. 9-12 are flow diagrams of exemplary process logic for a route-biased search in accordance with an embodiment of the invention.

FIGS. 9-12 are flow diagrams summarizing exemplary process logic for a route-biased search for points of interest in accordance with an embodiment of the invention. In FIG. 9, a route-biased mobile search at 902 receives a request to search for POIs. At decision block 904, the mode of operation is determined to be navigation mode or non-navigation mode. Process 906 is performed to identify POIs in navigation mode, as described in detail in FIG. 10. Process 908 is performed to identify POIs in non-navigation mode, as described in detail in FIG. 11. Once the POIs are identified, the route biased search logic performs a process to compute the detour costs for the identified POIs, as described in detail in FIG. 12. Once the detour costs have been computed, the route biased search logic re-ranks the POIs by detour cost at 912 and presents the ranked POIs to the user at 914.

Figure 10:
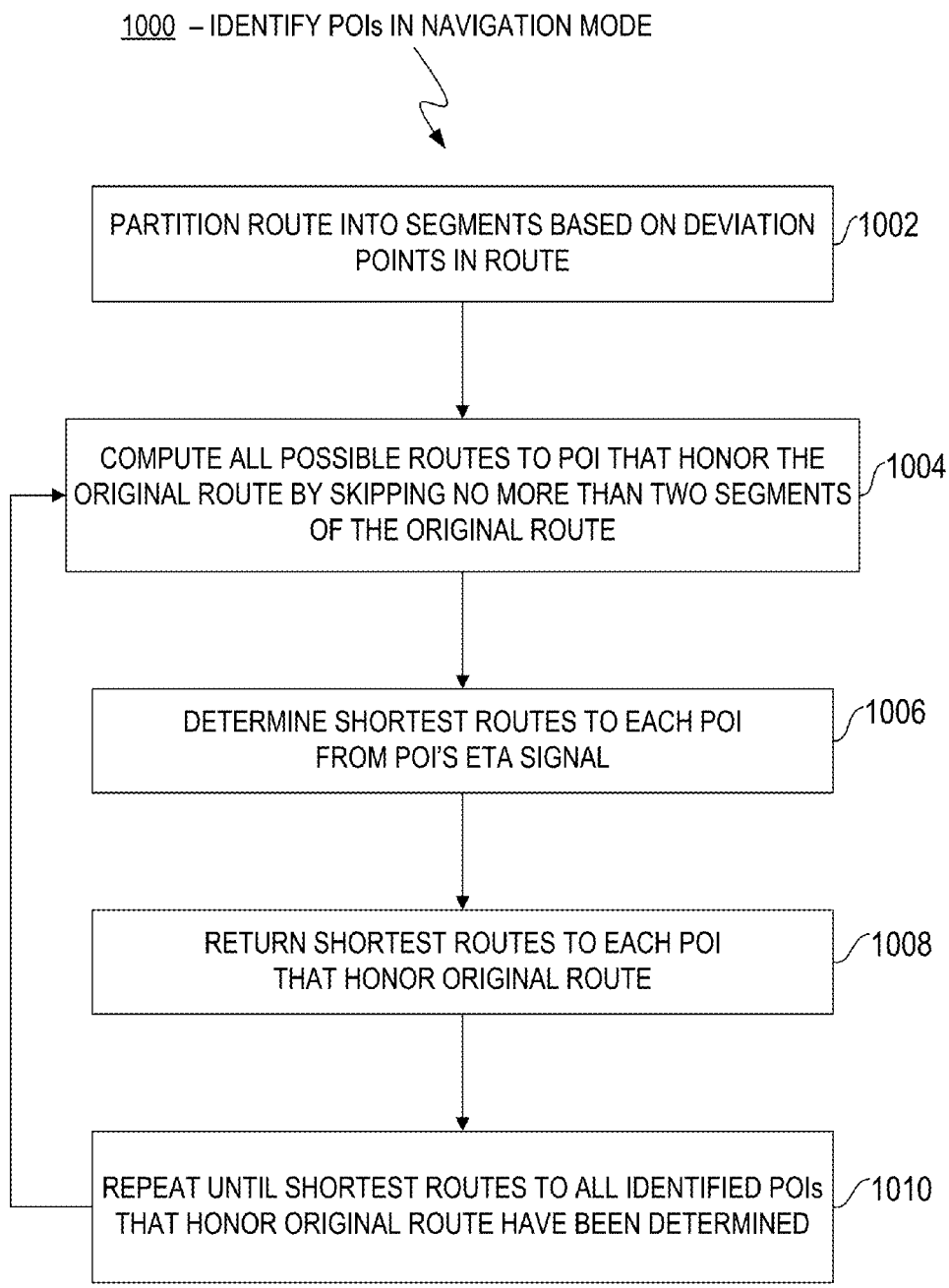

In FIG. 10, the process 1000 to identify POIs in navigation mode begins at 1002 by partitioning the route into segments based on deviation points in the route. At 1004, the process commences a routine to compute all possible routes to a POI search result from a conventional search, and determines whether there are routes to that POI that honor the original route by skipping no more than two segments of the original route. If there are routes to that POI that do honor the original route, then at 1006, the process determines the shortest routes to that POI from the POI's ETA signal. At 1008 the process returns the routes determined to be the shortest routes to the route-biased search process 900 in FIG. 9 for further processing. At 1010, the process is repeated until the shortest routes to all identified POIs that honor the original route have been determined. POIs for which no routes honor the original route are discarded.

Figure 11:
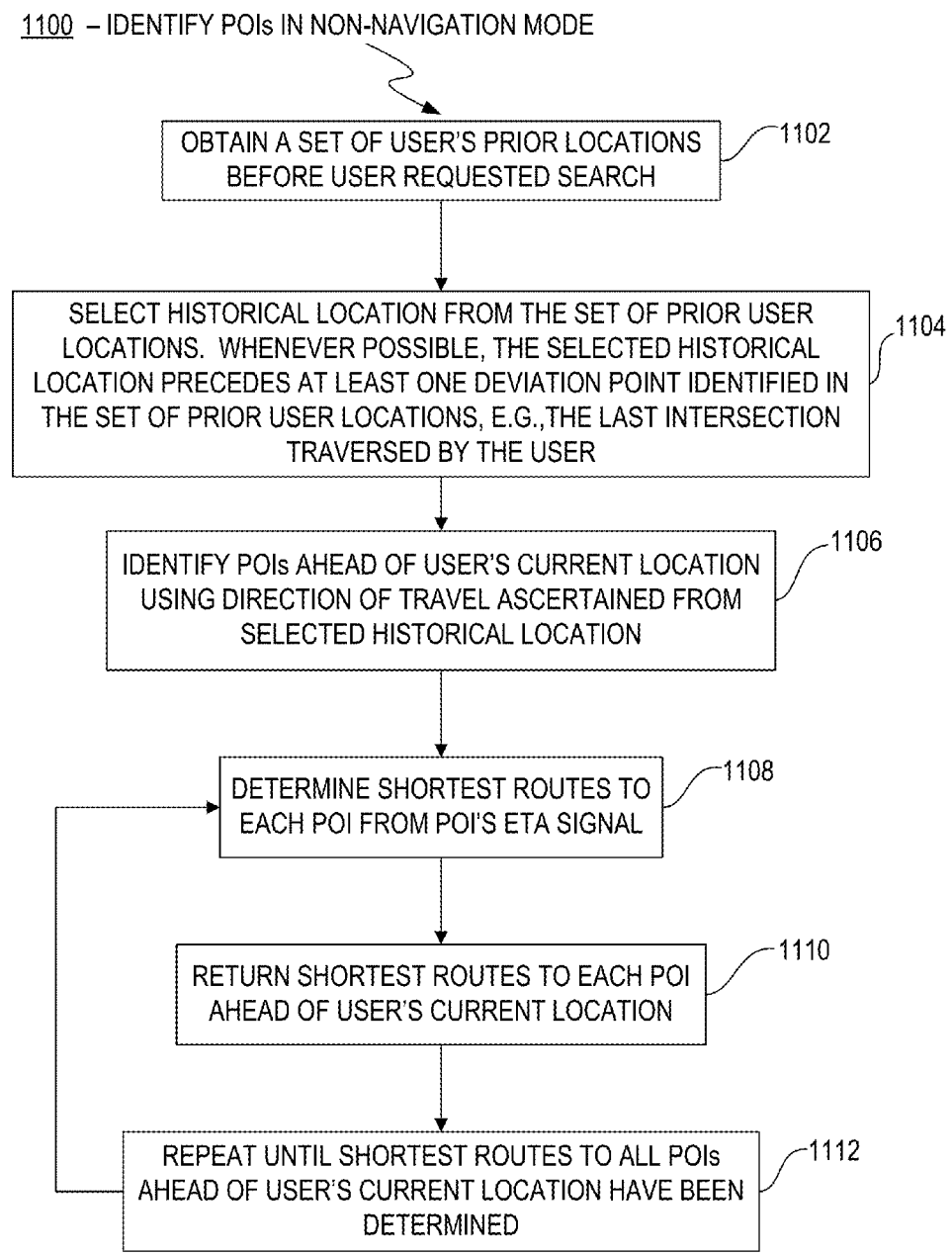

In FIG. 11, the process 1100 to identify POIs in non-navigation mode begins at 1102 by obtaining a set of the user's prior locations before the user requested the search for POIs. At 1104, the process selects an historical location from the set of prior user locations. In one embodiment, the set of prior user locations spans one or more deviation points for determining routes to POIs. Whenever possible, the selected historical location precedes at least one of the deviation points within the set of prior user locations, such as the last intersection traversed by the user, to allow computation of the best possible routes to identified POIs. At 1106, the process identifies those POIs returned by a conventional search that are located ahead of the user's current location based on a direction of travel ascertained from the user's current location compared to the selected historical location. At 1108, the process commences a routine to determine the shortest routes to each identified POI located ahead of the user's current location based on the POIs ETA signal, and at process 1110 returns the routes determined to be the shortest routes to the route-biased search process 900 in FIG. 9 for further processing. At 1112, the process is repeated until the shortest routes to all identified POIs located ahead of the user's current location have been determined. POIs that are not located ahead of the user's current location or POIs to which shortest routes cannot be determined are discarded.

Figure 12:
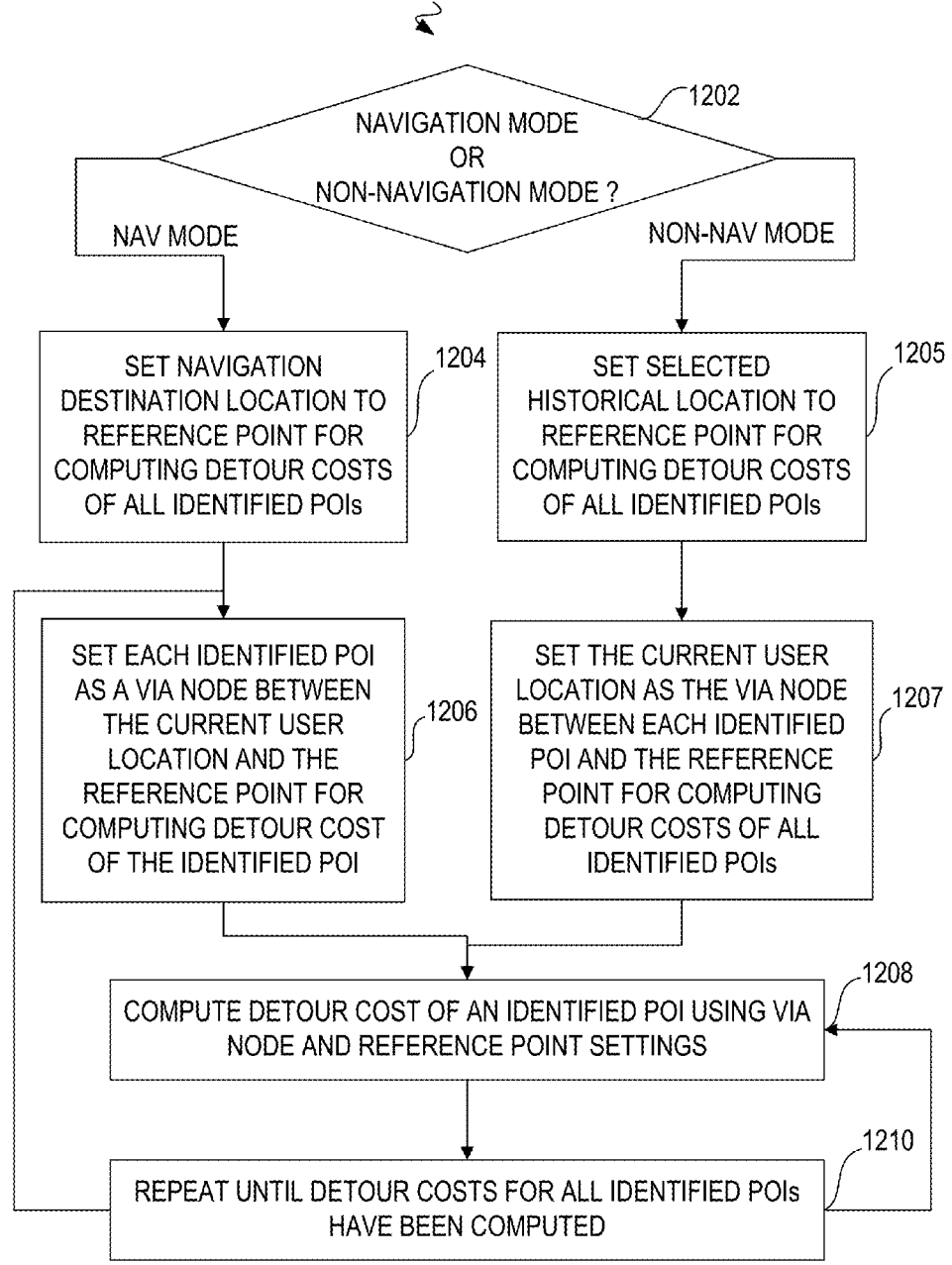

In FIG. 12, the process 1200 to compute detour cost for the identified POIs begins with a determination at 1202 of whether the route-biased search is operating in navigation mode or non-navigation mode. In navigation mode, the process sets the destination location to which the user is navigating to the reference point for computing detour costs of all identified POIs. At 1206, the process commences a routine to set each identified POI as a mid-point, also referred to as a via node, between the current user location U and the reference point R for the purpose of computing the detour cost of the identified POI. At process 1208 the process computes the detour cost of an identified POI using the mid-point and reference point settings. At 1210, the process is repeated until detour costs for all identified POIs have been computed.

In FIG. 12, in non-navigation mode, the process sets the selected historical location to the reference point for the purpose of computing the detour costs of all identified POIs. At 1207, the process sets the current user location as the mid point, or via node, between each identified POI and the reference point for the purpose of computing detour costs of all identified POIs. At 1208, the process commences a routine to compute the detour cost of an identified POI using the mid-point, or via node, and reference point settings. At 1210, the process repeats until detour costs for all identified POIs have been computed.

Any one of the methods described herein can be implemented on a variety of different data processing devices, including general-purpose computer systems, special purpose computer systems, etc. For example, the data processing systems that may use any one of the methods described herein may include a desktop computer or a laptop computer or a tablet computer or a smart phone, or a cellular telephone, or a personal digital assistant (PDA), an embedded electronic device or a consumer electronic device.

Figure 13:
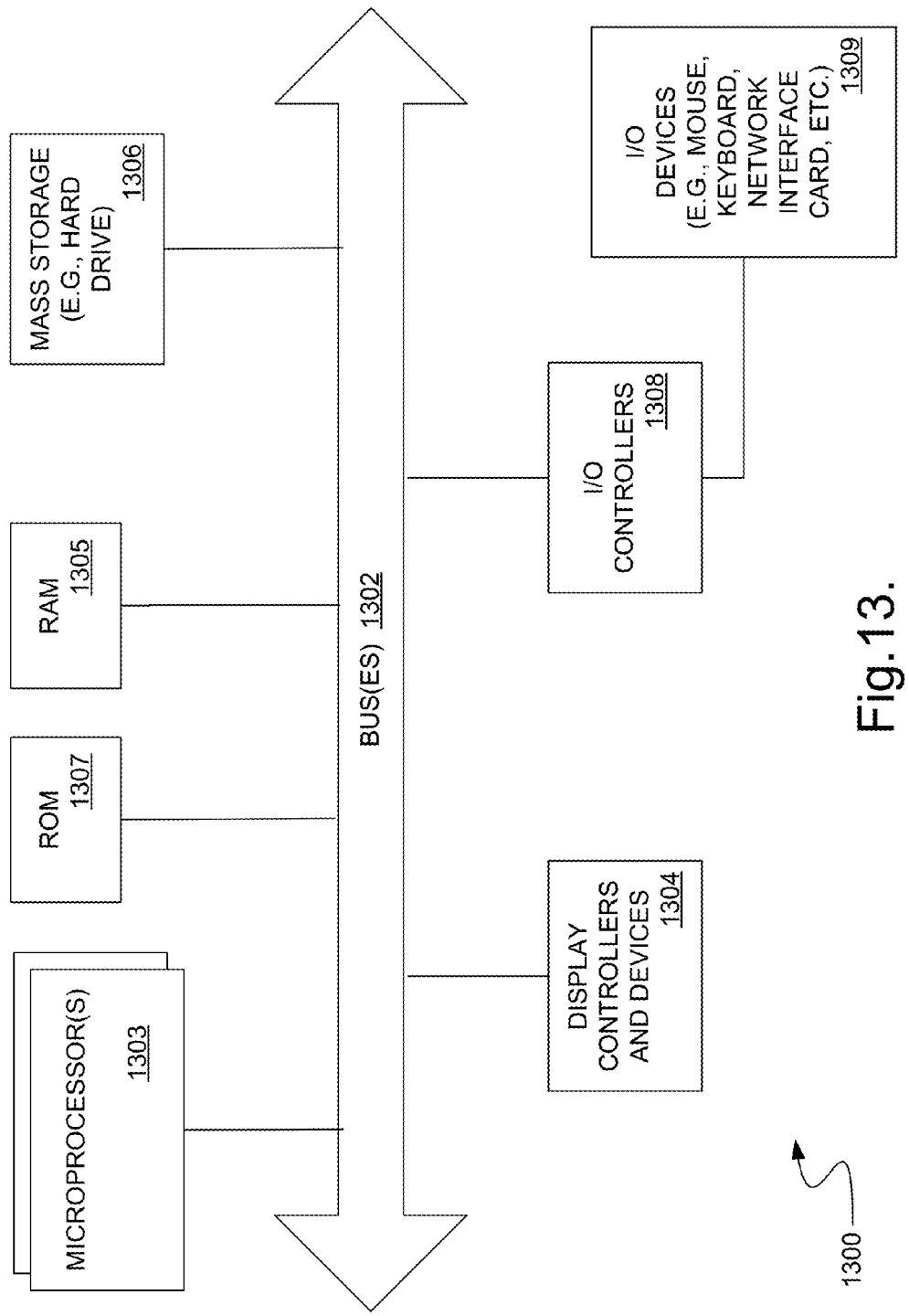
FIG. 13 is a block diagram of a typical computer system that can be used in implementing a route-biased search in a mobile navigation system in accordance with an embodiment of the invention.

FIG. 13 shows one example of a typical data processing system that may be used with the present invention. Note that while FIG. 13 illustrates the various components of a data processing system, such as a computer system, it is not intended to represent any particular architecture or manner of interconnecting the components as such details are not germane to the present invention. It will also be appreciated that other types of data processing systems that have fewer components than shown or more components than shown in FIG. 13 may also be used with the present invention. The data processing system of FIG. 13 may be, for example, an iOS device such as an iPhone, or a Macintosh computer from Apple Inc. of Cupertino, Calif.

As shown in FIG. 13, the data processing system 1300 includes one or more buses 1302 that serve to interconnect the various components of the system. One or more processors 1303 are coupled to the one or more buses 1302 as is known in the art. Memory 1305 may be DRAM or non-volatile RAM or may be flash memory or other types of memory. This memory is coupled to the one or more buses 1302 using techniques known in the art.

The data processing system 1300 can also include non-volatile memory 1307 that may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1302 using known interfaces and connection techniques.

A display controller 1304 is coupled to the one or more buses 1302 in order to receive display data to be displayed on a display device 1309 which can display any one of the user interface features or embodiments described herein. The display device 1309 can include an integrated touch input to provide a touch screen.

The data processing system 1300 can also include one or more input/output (I/O) controllers 1308 which provide interfaces for one or more I/O devices, such as one or more mice, touch screens, touch pads, joysticks, and other input devices including those known in the art and output devices (e.g. speakers). The input/output devices 1309 are coupled through one or more I/O controllers 1308 as is known in the art.

While FIG. 13 shows that the non-volatile memory 1307 and the memory 1305 are coupled to the one or more buses 1302 directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers.

As is known in the art, the one or more buses 1302 may include one or more bridges or controllers or adapters to interconnect between various buses. In one embodiment, the I/O controller 1308 includes a USB adapter for controlling USB peripherals and can control an Ethernet port or a wireless transceiver or combination of wireless transceivers.

It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 1305 or the non-volatile memory 1307 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software or to any particular source for the instructions executed by the data processing system.

Portions of what was described above may be implemented with logic circuitry such as a dedicated logic circuit or with a microcontroller or other form of processing core that executes program code instructions. Thus processes taught by the discussion above could be performed with program code such as machine-executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices 1306, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for mobile searching using a navigation application, the method comprising:
   in a mobile device:
      determining a route being followed by a user of the mobile device, the route represented in a navigation application operating on the mobile device, wherein the navigation application is operating a non-navigation mode with no destination entry by the user and wherein the route is determined based on a moving direction of the user;
      setting a reference point for the route, wherein the reference point is a point other than a route departure point of the route;
      identifying one or more points of interest (POIs) having estimated time of arrival ETA signals comparable to the route being followed based on the reference point and the user's current location;
      computing a detour cost associated with each of the one or more identified POIs, wherein the detour cost is computed using the reference point;
      including the detour cost as a ranking signal when re-ranking the one or more POIs using a single unified ranking algorithm; and
      presenting to the user of the mobile device the one or more ranked POIs and associated detour costs.

2. The computer-implemented method as in claim 1, further comprising:
   setting the reference point for the route being followed to a historical location of the user when operating in non-navigation mode; and
   setting the reference point for the route being followed to a destination location of the user when operating in navigation mode.

3. The computer-implemented method as in claim 2, wherein setting the reference point for the route being followed to a historical location of the user includes:
   obtaining a set of prior locations of the user;
   determining the route being followed by the user based on the set of prior locations and the user's current location;
   identifying any one or more deviation points in the route being followed by the user within the set of prior locations;
   selecting from the set of prior locations a historical location that precedes at least one of the identified deviation points; and
   setting the reference point for the route being followed to the historical location.

4. The computer-implemented method as in claim 1, further comprising:
   determining that the navigation application operating on the mobile device is in navigation mode after operating in the non-navigation mode;
   determining the route being followed by the user of the mobile device based on a predetermined route for navigating to a known destination; and
   setting the reference point to the known destination.

5. A mobile navigation system, the system comprising:
   a mobile device configured with a mobile navigation application, the mobile device in communication with a navigation server during operation of the mobile navigation application, the navigation server having a processor configured to:
   determine a route being followed by a user of the mobile device, the route represented in a navigation application operating on the mobile device, wherein the navigation application is operating a non-navigation mode with no destination entry by the user and wherein the route is determined based on a moving, direction of the user;
   set a reference point for the route, wherein the reference point is a point other than a route departure point of the route;
   identify one or more points of interest (POIs) having estimated time of arrival ETA signals comparable to the route being followed based on the reference point and the user's current location;
   compute a detour cost associated with each of the one or more identified POIs, wherein the detour cost is computed using the reference point;
   include the detour cost as a ranking signal when re-ranking the one or more POIs using a single unified ranking algorithm; and
   transmit to the mobile device the one or more ranked POIs and associated detour costs.

6. The mobile navigation system as in claim 5, the processor further configured to:
set the reference point for the route being followed to a historical location of the user when operating in non-navigation mode; and
set the reference point for the route being followed to a destination location of the user when operating in navigation mode.

7. The mobile navigation system as in claim 6, wherein to set the reference point for the route being followed to a historical location of the user, the processor is further configured to:
obtain a set of prior locations of the user;
determine the route being followed by the user based on the set of prior locations and the user's current location;
identify any one or more deviation points in the route being followed by the user within the set of prior locations;
select from the set of prior locations a historical location that precedes at least one of the identified deviation points; and
set the reference point for the route being followed to the historical location.

8. The mobile navigation system as in claim 6, wherein the processor is further configured to:
determine that the navigation application operating on the mobile device is in navigation mode after operating in the non-navigation mode;
determine the route being followed by the user of the mobile device based on a predetermined route for navigating to a known destination; and
set the reference point to the known destination.

9. The mobile navigation system as in claim 8, wherein to identify one or more points of interest (POIs) having estimated time of arrival ETA signals comparable to the route being followed, is to:
partition the route being followed by the user into segments based on deviation points in the route;
compute all possible routes from and to the user's current location and each identified POI, skipping no more than two segments of the route being followed;
determine shortest routes to each POI; and
identify which of the shortest routes have ETA signals comparable to the ETA signal of the route being followed.

10. The mobile navigation system as in claim 5, wherein to compute the detour cost based on the ETA signal for the POI, the processor is further configured to:
determine that the navigation application operating on the mobile device is in non-navigation mode;
combine a first ETA from the reference point to the user's current location with a second ETA from the user's current location to the POI;
compare the combined ETA with a reference ETA from the reference point to the POI; and
compute the detour cost based on how much the combined ETA exceeds the reference ETA.

11. The mobile navigation system as in claim 5, wherein to compute the detour cost based on the ETA signal for the POI, the processor is further configured to:
determine that the navigation application operating on the mobile device is in navigation mode;
combine a first ETA from the user's current location to the POI with a second ETA from the POI user's current location to the reference point;
compare the combined ETA with a reference ETA from the user's current location to the reference point; and
compute the detour cost based on how much the combined ETA exceeds the reference ETA.

12. The mobile navigation system as in claim 5, further comprising:
wherein the single unified ranking algorithm is based on one or more other ranking factors, including any one or more of a popularity, reviews, ratings and type of the POI, the type of the POI including any one or more of a gas station, a restaurant, a store, a hotel and other points of interest encountered while traveling.

13. At least one computer-readable non-transitory storage medium including instructions that, when executed on a processing system, cause the processing system to:
determine a route being followed by a user of the mobile device, the route represented in a navigation application operating on the mobile device, wherein the navigation application is operating a non-navigation mode with no destination entry by the user and wherein the route is determined based on a moving direction of the user;
set a reference point for the route, wherein the reference point is a point other than a route departure point of the route;
identify one or more points of interest (POIs) having estimated time of arrival ETA signals comparable to the route being followed based on the reference point and the user's current location;
compute a detour cost associated with each of the one or more identified POIs, wherein the detour cost is computed using the reference point;
include the detour cost as a ranking signal when re-ranking the one or more POIs using a single unified ranking algorithm; and
present to the user of the mobile device the one or more ranked POIs and associated detour costs.

14. The at least one computer-readable non-transitory storage medium of claim 13, the instructions further causing the processing system to:
set the reference point for the route being followed to a historical location of the user when operating in non-navigation mode; and
set the reference point for the route being followed to a destination location of the user when operating in navigation mode.

15. The at least one computer-readable non-transitory storage medium of claim 14, wherein to set the reference point for the route being followed to a historical location of the user includes instructions causing the processing system to:
obtain a set of prior locations of the user;
determine the route being followed by the user based on the set of prior locations and the user's current location;
identify any one or more deviation points in the route being followed by the user within the set of prior locations;
select from the set of prior locations a historical location that precedes at least one of the identified deviation points; and
set the reference point for the route being followed to the historical location.

16. The at least one computer-readable non-transitory storage medium of claim 13, the instructions further causing the processing system to:
determine that the navigation application operating on the mobile device is in navigation mode after operating in the non-navigation mode;

determine the route being followed by the user of the mobile device based on a predetermined route for navigating to a known destination; and set the reference point to the known destination.

17. The at least one computer-readable non-transitory storage medium of claim 13, wherein to identify one or more points of interest (POIs) having estimated time of arrival ETA signals comparable to the route being followed includes instructions further causing the processing system to:

partition the route being followed by the user into segments based on deviation points in the route;

compute all possible routes from and to the user's current location and each identified POI, skipping no more than two segments of the route being followed;

determine shortest routes to each POI; and identify which of the shortest routes have ETA signals comparable to the ETA signal of the route being followed.

18. The at least one computer-readable non-transitory storage medium of claim 13, wherein to compute the detour cost based on the ETA signal for the POI includes instructions further causing the processing system to:

combine a first ETA from the reference point to the user's current location with a second ETA from the user's current location to the POI;

compare the combined ETA with a reference ETA from the reference point to the POI; and compute the detour cost based on how much the combined ETA exceeds the reference ETA.

19. The at least one computer-readable non-transitory storage medium of claim 13, wherein to compute the detour cost based on the ETA signal for the POI includes instructions further causing the processing system to:

determine that the navigation application operating on the mobile device is in navigation mode;

combine a first ETA from the user's current location to the POI with a second ETA from the POI user's current location to the reference point;

compare the combined ETA with a reference ETA from the user's current location to the reference point; and compute the detour cost based on how much the combined ETA exceeds the reference ETA.

20. The at least one computer-readable non-transitory storage medium of claim 13, wherein the single unified ranking algorithm is based on one or more other ranking factors, including any one or more of a popularity, reviews, ratings and type of the POI, the type of the POI including any one or more of a gas station, a restaurant, a store, a hotel and other points of interest encountered while traveling.

21. The computer-implemented method as in claim 1, wherein the reference point is a point other than a route destination point of the route.

22. At least one computer-readable non-transitory storage medium including instructions that, when executed on a processing system, cause the processing system to:

determine a route being followed by a user of the mobile device, the route represented in a navigation application operating on the mobile device;

set a reference point for the route, wherein the reference point is a point other than a route departure point of the route and the reference point includes a prior location earlier in a journey of the user to a current location of the user;

identify one or more points of interest (POIs) having estimated time of arrival ETA signals comparable to the route being followed based on the reference point and the current location of the user;

compute a detour cost associated with each of the one or more identified POIs, wherein the detour cost is computed using the reference point, wherein the reference point is a point other than a route departure point of the route;

include the detour cost as a ranking signal when re-ranking the one or more POIs using a single unified ranking algorithm; and present to the user of the mobile device the one or more ranked POIs and associated detour costs.

23. The at least one computer-readable non-transitory storage medium of claim 22, the instructions further causing the processing system to:

determine that the navigation application operating on the mobile device is in non-navigation mode;

set the reference point for the route being followed to a historical location of the user when operating in non-navigation mode; and set the reference point for the route being followed to a destination location of the user when operating in navigation mode.

24. The at least one computer-readable non-transitory storage medium of claim 23, wherein to set the reference point for the route being followed to a historical location of the user includes instructions causing the processing system to:

obtain a set of prior locations of the user;

determine the route being followed by the user based on the set of prior locations and the user's current location;

identify any one or more deviation points in the route being followed by the user within the set of prior locations;

select from the set of prior locations a historical location that precedes at least one of the identified deviation points; and set the reference point for the route being followed to the historical location.

25. The at least one computer-readable non-transitory storage medium of claim 22, the instructions further causing the processing system to:

determine that the navigation application operating on the mobile device is in navigation mode;

determine the route being followed by the user of the mobile device based on a predetermined route for navigating to a known destination; and set the reference point to the known destination.

26. The at least one computer-readable non-transitory storage medium of claim 22, wherein to identify one or more points of interest (POIs) having estimated time of arrival ETA signals comparable to the route being followed includes instructions further causing the processing system to:

partition the route being followed by the user into segments based on deviation points in the route;

compute all possible routes from and to the user's current location and each identified POI, skipping no more than two segments of the route being followed;

determine shortest routes to each POI; and identify which of the shortest routes have ETA signals comparable to the ETA signal of the route being followed.

27. The at least one computer-readable non-transitory storage medium of claim 22, wherein to compute the detour cost based on the ETA signal for the POI includes instructions further causing the processing system to:

determine that the navigation application operating on the mobile device is in non-navigation mode;
combine a first ETA from the reference point to the user's current location with a second ETA from the user's current location to the POI;
compare the combined ETA with a reference ETA from the reference point to the POI; and
compute the detour cost based on how much the combined ETA exceeds the reference ETA.

28. The at least one computer-readable non-transitory storage medium of claim 22, wherein to compute the detour cost based on the ETA signal for the POI includes instructions further causing the processing system to:
determine that the navigation application operating on the mobile device is in navigation mode;
combine a first ETA from the user's current location to the POI with a second ETA from the POI user's current location to the reference point;
compare the combined ETA with a reference ETA from the user's current location to the reference point; and
compute the detour cost based on how much the combined ETA exceeds the reference ETA.

29. The at least one computer-readable non-transitory storage medium of claim 22, wherein the single unified ranking algorithm is based on one or more other ranking factors, including any one or more of a popularity, reviews, ratings and type of the POI, the type of the POI including any one or more of a gas station, a restaurant, a store, a hotel and other points of interest encountered while traveling.

\* \* \* \* \*